United States Patent Office 2,694,053
Patented Nov. 9, 1954

2,694,053

TRIMETHYLENE POLYAMINES AS ACTIVATORS FOR EMULSION POLYMERIZATION REACTIONS

Carl A. Uraneck, Borger, Tex., and Spencer H. Landes, Stillwater, Okla., assignors to Phillips Petroleum Company, a corporation of Delaware No Drawing. Application January 30, 1950,
Serial No. 141,356

16 Claims. (Cl. 260—84.7)

This invention relates to the polymerization of unsaturated organic compounds while dispersed in an aqueous emulsion. In some of its preferred aspects the invention relates to the employment of novel reductants in conjunction with certain hydroperoxides in recipes used at low polymerization temperatures for effecting production of synthetic rubber by emulsion polymerization of conjugated diolefins.

Numerous recipes have been developed for carrying out emulsion polymerization reactions at low temperatures. Highly activated recipes, such as those of the redox type, have been frequently employed. The materials which have been suggested as oxidizing and reducing components in redox emulsion polymerization systems are numerous and varied. Heavy metal salts, such as soluble ferrous salts, have been employed as reductants and among the oxygen-giving materials such compounds as persulfates and peroxides are well known. It is also frequently preferred to include an organic reducing agent such as a sugar or other readily oxidizable polyhydroxy compound in the polymerization recipe although in many instances satisfactory results are realized in the absence of this component.

An object of this invention is to effect polymerization of organic compounds in aqueous emulsion. Another object of the invention is to provide a new type of recipe for the low temperature emulsion polymerization of conjugated diolefins. A further object is to polymerize conjugated diolefins in aqueous emulsion to produce synthetic rubbers, using a recipe free from heavy metal compounds. Yet another object is to effect such polymerization in the absence of sugars. A further object is to provide new activators useful in emulsion polymerization of unsaturated organic compounds. Other objects and advantages of the invention will be apparent, to one skilled in the art, from the accompanying disclosure and discussion.

We have now discovered that excellent conversion rates can be obtained in emulsion polymerization systems through the use of activators comprising trimethylene polyamines together with oxidizing components comprising trisubstituted hydroperoxymethanes, these latter components being employed as initiators, or catalysts, for the polymerization. These recipes afford a means for effecting polymerization reactions in the absence of heavy metal salt activators, and we prefer to use heavy metal-free recipes.

The trimethylene polyamines, also referred to as 1,3-diaminopropanes, employed in the polymerization systems herein described are preferably those represented by the formula

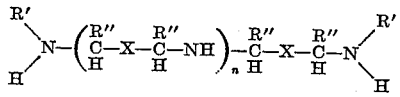

where R' is one of the group consisting of hydrogen, methyl, ethyl, hydroxymethyl, hydroxyethyl, and carboxyl radicals, where R'' is hydrogen or methyl, where X is one of the group consisting of

and

where R''' is hydrogen, methyl, or an activating substituent of the group consisting of —OR, —SR, —NR$_2$, —CN, —SCN, —COOR, and —CHO, where R is one of the group consisting of hydrogen, methyl, ethyl, n-propyl and isopropyl, and n is an integer between 0 and 8, inclusive. In order to obtain optimum results, the polyamino compound must be of such nature that substantial amounts are present in the aqueous phase. The distribution of the polyamino compound between the aqueous and oil phases appears to be an important factor in determining the extent of the activating effect of a given compound. In other words, if a major portion of the polyamino compound is in the aqueous phase, the compound will generally be more effective as an activator than when a material of greater oil solubility is employed.

Of the trimethylene polyamines, we much prefer to use the compounds containing a single trimethylene group together with its two terminal amine groups. The simplest of these trimethylene polyamines, or 1,3-diaminopropanes, is 1,3-diaminopropane itself. This compound is also known as trimethylenediamine. Substitution of an —OH or a =O on the central carbon atom of 1,3-diaminopropane appears to enhance the activity in the emulsion polymerization recipes, hence 1,3-diaminoacetone and 1,3-diamino-2-propanol are at present the most preferred compounds of our invention. Other 1,3-diaminopropanes, which contain a plurality of trimethylene (unsubstituted or substituted) groups alternating with amine groups and which are regarded as polymers of the parent compound, can also be employed; for example tri(trimethylene)tetramine (sometimes erroneously designated as tripropylenetetramine) is considered to be a polymer of trimethylenediamine. All of the polyamine compounds of our invention have the basic structure of 1,3-diaminopropane and hence can be broadly referred to as "1,3-diaminopropane and its derivatives and polymers thereof"; they can also be broadly referred to as "1,3-diaminopropanes," and also as "trimethylene polyamines." As indicated hereinabove, it is preferred to use only those which come within the structural formula defined in the preceding paragraph, and all of the compounds so defined are operable in our process to some extent though it will of course be appreciated that the relative activities and efficacies will vary considerably depending upon the size of the molecule and the various constituents thereof, as well as upon the other components and their proportions in the various recipes which may be used. Those skilled in the art will readily ascertain any of the specific compounds which are within the scope of the sructural formula. However, by way of example the following are mentioned: 1,3-diaminopropane, 1,3-diaminoacetone, 1,3-diamino-2-propanol, N,N'-dimethyl-1,3-diaminoacetone, N-ethoxy-1,3-diamino-2- propanol, 1,3-diamino-2-carboxypropane, 1,3-diamino-2-(dimethylamino)propane, 2,4 - diaminopentane, 1,3 - diamino - 2 - cyanopropane, 1,3 - diamino - 2 - mercaptopropane, di(trimethylene)triamine, tri(trimethylene)tetramine, tetra(trimethylene)pentamine, polytrimethylene polyamines in which the amino and trimethylene groups can be substituted as previously mentioned, and carbamates of each of the foregoing.

The oxidizing components used in these recipes are preferably trisubstituted hydroperoxymethanes, also hereinafter referred to as hydroperoxides. These compounds are represented by the formula

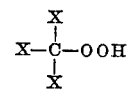

wherein each X, individually, is one of the group consisting of aliphatic, cycloaliphatic, aromatic, olefinic, and cycloolefinic radicals. Each of these radicals can be completely hydrocarbon in character, and can be of mixed character such as aralkyl, alkaryl, and the like, and can also have non-hydrocarbon substituents; particularly useful non-hydrocarbon substituents include oxygen in the form of hydroxy and ether compounds, sulfur in similar compounds (i. e. mercapto compounds and thioethers), and halogen compounds. Such hydroperoxides can be easily prepared by simple oxidation, with free oxygen, of the corresponding hydrocarbon or hydrocarbon derivative, i. e. of the parent trisubstituted methane. If desired the hydroperoxides can be used in the form of their alkali metal salts. Among the preferred trisubstituted hydroperoxy methanes are those containing from 10 to 30 carbon atoms per molecule, as disclosed and claimed in copending application Serial No. 107,638, filed July 29, 1949. Further examples of suitable hydroperoxides which can be used are: trialkyl hydroperoxymethane having from 6 to 9 carbon atoms per molecule, alkenyl trisubstituted hydroperoxymethanes having from 6 to 30 carbon atoms, hydroperoxides of octahydrophenanthrene and its derivatives, hydroperoxides of alkyl tetralins and their derivatives, aryl cyclohexyl hydroperoxides, tertiary butyl hydroperoxide. In addition to or instead of hydroperoxides, organic peroxides can be used as the oxidant material, benzoyl peroxide being perhaps the most widely used of the many organic peroxides known. In general, when the material acting as an oxidant in our recipes is a peroxidic-type material, it can be generically described by the formula R'OOR" where R' is one of the group alkyl, aryl, acyl, aralkyl, and cycloalkyl and R" is one of the group hydrogen, alkyl, aryl, acyl, aralkyl, and cycloalkyl; the named hydrocarbon radicals can also contain olefinic bonds in an aliphatic chain and/or be substituted by non-hydrocarbon groups as indicated hereinabove in more detail with respect to the trisubstituted hydroperoxymethanes.

In the polymerization systems of this invention, the trimethylene polyamines appear to act as activator and reductant, and no other activating ingredients, such as compounds of polyvalent-multivalent metals, or reducing ingredients, such as a reducing sugar, need be present in order to obtain satisfactory and rapid polymerization of the monomeric material, even at subfreezing temperatures.

The amount of trimethylene polyamine compound used to obtain optimum results is dependent upon other ingredients in the recipe. Preferred results are usually obtained with between 0.02 to 5 parts by weight of the polyamine compound per 100 parts of monomeric material.

The amount of hydroperoxymethane used to obtain an optimum reaction rate will depend upon the polymerization recipe used and upon the reaction conditions. The amount is generally expressed in millimols per 100 parts of monomeric material, using in each instance the same units of weight throughout, i. e. when the monomeric material is measured in pounds the hydroperoxymethane is measured in millipound mols. The same is true for other ingredients in the polymerization recipe. An optimum rate of polymerization is usually obtained with the amount of hydroperoxymethane between 0.1 and 10 millimols per 100 parts by weight of monomeric material.

It is frequently desirable to include water-soluble components in the aqueous phase, particularly in order to depress the freezing point when the polymerization temperature is below the normal freezing point of water. Inorganic salts and alcohols can be so used. Examples of suitable salts are those of ammonium, and alkali and alkaline earth metals, including chlorides, nitrates, sulfates, etc. Alcohols which are applicable comprise water-soluble compounds of both monohydric and polyhydric types, including methanol, ethylene glycol, glycerol and erythritol by way of example.

One of the advantages of the polymerization recipes, as disclosed herein, is that they are applicable for use in the production of "high solids" latices, i. e. latices resulting from the use of a smaller amount of aqueous medium and emulsifier than is generally used in conventional polymerization procedures. For this type of operation the weight ratio of aqueous phase to monomeric material will generally be in the range from 0.5:1 to 1:1 and the extent of conversion will generally range from 70 per cent to substantially complete conversion.

Emulsifying agents which are applicable in these low temperature polymerizations are materials such as potassium laurate, potassium oleate, and the like, and salts of rosin acids. Particularly useful are the specific mixtures of salts of fatty acids and of rosin acids, which seem to have a synergistic action when used with some of these same hydroperoxides, as more fully disclosed and claimed by Charles F. Fryling and Archie E. Follett in their application Serial No. 72,534, filed January 24, 1949. However, other emulsifying agents, such as nonionic emulsifying agents, salts of alkyl aromatic sulfonic acids, salts of alkyl sulfates, and the like which will produce favorable results under the conditions of the reaction, can also be used in practicing the invention, either alone or in admixture with soaps. The amount and kind of emulsifier used to obtain optimum results is somewhat dependent upon the relative amounts of monomeric material and aqueous phase, the reaction temperature, and the other ingredients of the polymerization mixture. Usually an amount between about 0.3 and 5 parts by weight per 100 parts of monomeric material will be found to be sufficient.

The pH of the aqueous phase may be varied over a fairly wide range without producing unduly deleterious effects on the conversion rate or the properties of the polymer. In general the pH may be within the range of 9.0 to 12.0 and it may be advantageous to have a pH higher than 12.0 in some instances. In most cases optimum results are obtained if the pH is at least 10.0 or higher, and often a pH in the range of 11.5 to 12 is most effective.

When carrying out polymerization reactions according to the process of this invention, it is frequently considered desirable to include an electrolyte in the system, such as potassium chloride, trisodium phosphate, or other salt which will not produce deleterious effects. One function of an electrolyte is to increase the fluidity of the latex, and it also reduces precoagulation. Generally the amount of such salt will not exceed one part by weight per 100 parts of monomers.

We generally use the trimethylene polyamines discussed herein as activators in polymerization recipes at low polymerization temperatures, i. e. from about 30° C. and preferably not above 10° C. down to well below the freezing point of water, such as −40° C. or lower. However, temperatures as high as 60° C. or even higher may be employed if desired.

In effecting emulsion polymerization of a monomeric material, particularly when a batch-type or semi-batch-type operation is carried out, the reactor is usually first charged with the aqueous medium, which contains the desired emulsifying agent, and the monomeric material is then admixed with agitation of the contents. At the same time a reaction modifier, such as a mercaptan, is also included, usually in solution in at least a part of the monomeric material. An activator solution and an oxidant are separately added to the reaction mixture, and reaction then proceeds. A preferred manner of adding these two constituents is usually to have the activator solution incorporated in the aqueous medium prior to addition of the monomeric material, and to add the oxidant as the last ingredient. Sometimes, however, satisfactory polymerization results can be obtained when this procedure is reversed. It is also sometimes the practice to add portions of one or the other of the activator solutions and oxidant intermittently, or continuously, during the course of the reaction. If the operation is carried out continuously, streams of the various ingredients are admixed in somewhat the same order prior to their final introduction into the polymerization reaction zone.

The monomeric material polymerized to produce polymers by the process of this invention comprises unsaturated organic compounds which generally contain the characteristic structure $CH_2=C<$ and, in most cases, have at least one of the disconnected valences attached to an electronegative group, that is, a group which increases the polar character of the molecule such as a chlorine group or an organic group containing a double or triple bond such as vinyl, phenyl, cyano, carboxy or the like. Included in this class of monomers are the conjugated butadienes or 1,3-butadienes such as butadiene (1,3-butadiene), 2,3-dimethyl-1,3-butadiene, isoprene, piperylene, 3-furyl-1,3-butadiene, 3-methoxy-1,3-butadiene and the like; haloprenes, such as chloroprene (2-chloro-1,3-butadiene), bromoprene, methylchloroprene (2-chloro-3-methyl-1,3-butadiene), and the like; aryl olefins such as styrene, various alkyl styrenes, p-chlorostyrene, p-methoxystyrene, alpha-methylstyrene, vinylnaphthalene and similar derivatives thereof, and the like; acrylic and substituted acrylic acids and their esters, nitriles and amides such as acrylic acid, methacrylic acid, methyl acrylate, ethyl acrylate, methyl alpha-chloroacrylate, methyl methacrylate, ethyl methacrylate, butyl methacrylate, methyl ethacrylate, acrylonitrile, methacrylonitrile, methacrylamide and the like, methyl isopropenyl ketone, methyl vinyl ketone, methyl vinyl ether, vinylethinyl alkyl carbinols, vinyl acetate, vinyl chloride, vinylidene chloride, vinylfurane, vinylcarbazole, vinylacetylene and other unsaturated hydrocarbons, esters, alcohols, acids, ethers, etc., of the types described. Such unsaturated compounds may be polymerized alone, in which case simple linear polymers are formed, or mixtures of two or more of such compounds which are copolymerizable with each other in aqueous emulsion may be polymerized to form linear copolymers.

The process of this invention is particularly effective when the monomeric material polymerized is a polymerizable aliphatic conjugated diolefin or a mixture of such a conjugated diolefin with lesser amounts of one or more other compounds containing an active $CH_2=C<$ group which are copolymerizable therewith such as aryl olefins, acrylic and substituted acrylic acids, esters, nitriles and amides, methyl isopropenyl ketone, vinyl chloride, and similar compounds mentioned hereinabove. In this case the products of the polymerization are high molecular weight linear polymers and copolymers which are rubbery in character and may be called synthetic rubber. Often preferred as reactants are conjugated dienes having not more than six carbon atoms per molecule. Although, as can be readily deduced from the foregoing, there is a host of possible reactants, the most readily and commercially available monomers at present are butadiene itself (1,3-butadiene) and styrene. The invention will, therefore, be more particularly discussed and exemplified with reference to these typical reactants. With these specific monomers, it is usually preferred to use them together, in relative ratios of butadiene to styrene between 65:35 and 90:10 by weight.

It is generally preferred that the emulsion be of an "oil in water" type, with the ratio of aqueous medium to monomeric material between about 0.5:1 and about 2.75:1, in parts by weight. It is frequently desirable to include water-soluble components in the aqueous phase, particularly when the polymerization temperatures are below freezing. Inorganic salts and alcohols can be so used as indicated hereinabove. The amount of alcoholic ingredient used in a polymerization recipe must be sufficient to prevent freezing of the aqueous phase and generally ranges from 20 to 80 parts per 100 parts of monomers charged. In most cases the amount of water employed is sufficient to make the total quantity of the alcohol-water mixture equal 150 to 200 parts. In cases where it is desired to use a larger quantity of the alcohol-water mixture, say around 250 parts, the amount of alcohol may be increased to as much as 120 parts. It is preferred that the alcohol be such that it is substantially insoluble in the non-aqueous phase, and that 90 per cent, or more, of the alcohol present be in the aqueous phase. A high-boiling alcohol such as glycerine is difficult to recover from the resulting serum; a low-boiling alcohol such as methanol is easily removed and frequently preferred. Other aliphatic alcohols which are higher-boiling than methanol, such as propanol, are frequently less satisfactory. If the resulting latex tends to gel at low reaction temperatures, a larger proportion of aqueous phase should be used. In the practice of the invention suitable means will be necessary to establish and maintain an emulsion and to remove reaction heat to maintain a desired reaction temperature. The polymerization may be conducted in batches, semicontinuously, or continuously. The total pressure on the reactants is preferably at least as great the total vapor pressure of the mixture, so that the initial reactants will be present in liquid phase. Usually 50 to 98 per cent of the monomeric material is polymerized.

In preparing synthetic rubber by polymerizing conjugated dienes by the process of the invention, it is usually desirable to use a polymerization modifying agent, as is usually true in other polymerizations to produce synthetic rubber. Preferred polymerization modifiers for use in the process of the present invention are alkyl mercaptans, and these may be of primary, secondary, or tertiary configurations, and generally range from $C_8$ to $C_{16}$ compounds, but may have more or fewer carbon atoms per molecule. Mixtures or blends of mercaptans are also frequently considered desirable and in many cases are preferred to the pure compounds. The amount of mercaptan employed will vary, depending upon the particular compound or blend chosen, the operating temperature, the freezing point depressant employed, and the results desired. In general, the greater modification is obtained when operating at low temperatures and therefore a smaller amount of mercaptan is added to yield a product of a given Mooney value, than is used at higher temperatures. In the case of tertiary mercaptans, such as tertiary $C_{12}$ mercaptans, blends of tertiary $C_{12}$, $C_{14}$, and $C_{16}$ mercaptans, and the like, satisfactory modification is obtained with 0.05 to 0.3 part mercaptan per 100 parts monomers, but smaller or larger amounts may be employed in some instances. In fact, amounts as large as 2.0 parts per 100 parts of monomers may be used. Thus the amount of mercaptan is adjusted to suit the case at hand.

Advantages of this invention are illustrated by the following examples. The reactants, and their proportions, and the other specific ingredients of the recipes are presented as being typical and should not be construed to limit the invention unduly.

*Example I*

A series of polymerizations was run using variable quantities of 1,3-diamino-2-propanol as the activator. The following recipe was employed:

| | Parts by weight |
|---|---|
| Butadiene | 70 |
| Styrene | 30 |
| Water, total | 180 |
| Fatty acir soap flakes [1] | 5 |
| Mercaptan blend [2] | 0.1 |
| 1,3-diamino-2-propanol | Variable |
| Tert.-butylisopropylbenzene hydroperoxide | 0.416 (2 millimols) |
| Potassium chloride | 0.4 |

[1] Potassium Office Rubber Reserve soap.
[2] A blend of tertiary $C_{12}$, $C_{14}$, and $C_{16}$ aliphatic mercaptans in a ratio of 3 : 1 : 1 parts by weight.

A mixture of the emulsifying agent, water, and potassium chloride was prepared and potassium hydroxide added to adjust the pH within the range 11.5 to 12.0. A solution of the hydroperoxide and mercaptan in styrene was then introduced followed by the butadiene. The reactor was pressured to 30 pounds per square inch gauge with nitrogen and the temperature adjusted to 5° C. Ten parts water was added to the 1,3-diamino-2-propanol to make a solution and this mixture was then charged to the reactor. Polymerization was effected in the conventional manner while the temperature was held at 5° C. Results are tabulated below.

| 1,3-Diamino-2-propanol | | Hydroperoxide | | Conversion, percent | | | |
|---|---|---|---|---|---|---|---|
| Parts | Millimols | Parts | Millimols | 2 Hours | 4 Hours | 6 Hours | 22 Hours |
| 0.25 | 2.77 | 0.416 | 2 | 12 | 14 | 26 | 79 |
| 0.5 | 5.55 | 0.416 | 2 | 18 | 34 | 36 | 81 |
| 0.75 | 8.33 | 0.416 | 2 | 22 | 29 | 42 | 74 |

*Example II*

The recipe of Example I was employed for carrying out a butadiene-styrene copolymerization at 5° C. except that 6.75 millimols (0.5 part) 1,3-diaminopropane was used as the activator instead of 1,3-diamino-2-propanol. The pH of the system was within the range 11.5 to 12.0. The amount of tert-butylisoproplybenzene hydroperoxide present was 2 millimols (0.416 part). The following time-conversion data were obtained:

| Time, hours: | Conversion, per cent |
|---|---|
| 2 | 7 |
| 4 | 12 |
| 6 | 21 |
| 24 | 36 |

*Example III*

Emulsion polymerization of a butadiene-styrene mixture was carried out in the manner of Examples I and II, but employing tri(trimethylene)tetramine as the activator. The percentage conversion was low, only 2% in 5 hours. However, in this run the pH was only 10.5, and a higher pH gives improved conversion rates.

Example IV

A series of runs was made using 1,3-diaminoacetone as the activator in the following polymerization recipe:

| | Parts by weight |
|---|---|
| Butadiene | 70 |
| Styrene | 30 |
| Water, total | 180 |
| Fatty acid soap [1] | 5 |
| Mercaptan blend [1] | 0.1 |
| 1,3-diaminoacetone | 0.176 (2 millimols) |
| Tert-butylisopropylbenzene hydroperoxide | 0.208 (1 millimol) |
| Potassium chloride | 0.4 |

[1] As in Example I.

Potassium hydroxide in variable quantities was added to the soap to give degrees of neutralization ranging from 100 to 115 per cent. The polymerization procedure was the same as that given in Example I. The following results were obtained:

| Soap Neutralization, Percent | Conversion, Percent | | | |
|---|---|---|---|---|
| | 2 Hours | 5 Hours | 8 Hours | 24 Hours |
| 100 | 2 | 11 | 14 | 40 |
| 105 | 8 | 19 | 28 | 76 |
| 110 | 6 | 15 | 24 | 66 |
| 115 | 7 | 18 | 27 | 64 |

Another series of runs was made in which the quantity of 1,3-diaminoacetone was varied. There was also an additional run in which 1,3-diamino-2-propanol was employed as the activator. The results were as follows:

| Activator | | Soap—Neutralization, Percent | Conversion, Percent | | | |
|---|---|---|---|---|---|---|
| Compound Type | Millimols | | 2 hours | 5 hours | 8 hours | 24 hours |
| 1,3-Diaminoacetone | 0.5 | 105 | 2 | 9 | 16 | 53 |
| Do | 1.0 | 105 | 1 | 9 | 16 | 58 |
| Do | 3.0 | 105 | 3 | 13 | 22 | 67 |
| 1,3-Diamino-2-propanol | 2.0 | 105 | 6 | 15 | 24 | 71 |

As will be evident to those skilled in the art, various modifications of this invention can be made, or followed, in the light of the foregoing disclosure and discussion, without departing from the spirit or scope of the disclosure or from the scope of the claims.

We claim:

1. In the production of synthetic rubber by polymerization of a monomeric material comprising a conjugated diene having not more than six carbon atoms per molecule while dispersed in an aqueous medium in the presence of a catalytic composition comprising an oxidant and a reductant, the improvement which comprises polymerizing said monomeric material in the presence of a reductant together with a material which acts as an oxidant in the presence of said reductant under the conditions of polymerization, said reductant comprising a compound having the formula

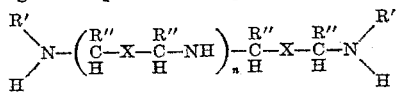

where R' is selected from the group consisting of hydrogen, methyl, ethyl, hydroxymethyl, hydroxyethyl, and carboxyl radicals, where R'' is selected from the group consisting of hydrogen and methyl, where X is selected from the group consisting of

and

where R''' is selected from the group consisting of —H, —CH₃, —OR, —SR, —NR₂, —CN, —SCN, —COOR, and —CHO, where R is selected from the group consisting of hydrogen, methyl, ethyl, n-propyl, and isopropyl, and n is an integer between 0 and 8, inclusive.

2. In a process for the polymerization of a monomeric material comprising an organic compound having an active CH₂=C< group at polymerization conditions while dispersed in an aqueous medium in the presence of a catalyst composition comprising an oxidant and a reductant, the improvement which comprises using as said reductant a compound having the formula

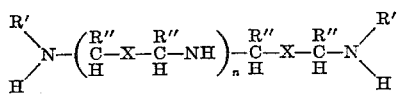

where R' is selected from the group consisting of hydrogen, methyl, ethyl, hydroxymethyl, hydroxyethyl, and carboxyl radicals, where R'' is selected from the group consisting of hydrogen and methyl, where X is selected from the group consisting of

and

where R''' is selected from the group consisting of —H, —CH₃, —OR, —SR, —NR₂, —CN, —SCN, —COOR, and —CHO, where R is selected from the group consisting of hydrogen, methyl, ethyl, n-propyl, and isopropyl, and n is an integer between 0 and 8, inclusive.

3. A process according to claim 2 wherein said reductant is 1,3-diaminoacetone.

4. A process according to claim 2 wherein said reductant is 1,3-diamino-2-propanol.

5. A process according to claim 2 wherein said reductant is 1,3-diaminopropane.

6. A process according to claim 2 wherein said reductant is tri(trimethylene)tetramine.

7. A process for producing synthetic rubber which comprises establishing and maintaining at a polymerization temperature not higher than 30° C. an emulsion of an aqueous phase, a liquid monomeric material comprising a major amount of 1,3-butadiene and a minor amount of styrene, an emulsifying agent, a reaction modifier, a peroxidic-type oxidant, and a compound having the formula

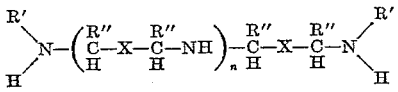

where R' is selected from the group consisting of hydrogen, methyl, ethyl, hydroxymethyl, hydroxyethyl, and carboxyl radicals, where R'' is selected from the group consisting of hydrogen and methyl, where X is selected from the group consisting of

and

where R''' is selected from the group consisting of —H, —CH₃, —OR, —SR, —NR₂, —CN, —SCN, —COOR, and —CHO, where R is selected from the group consisting of hydrogen, methyl, ethyl, n-propyl, and isopropyl, and n is an integer between 0 and 8, inclusive.

8. In the polymerization of a monomeric material comprising an organic compound having an active CH₂=C< group at a polymerization temperature while dispersed in an aqueous medium in the presence of an oxidant and a reductant, the improvement which comprises using as said reductant 0.02 to 5 parts (per 100 parts by weight of said monomeric material) of a compound having the formula

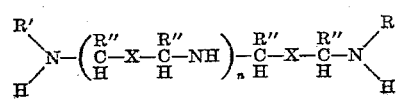

where R' is selected from the group consisting of hydrogen, methyl, ethyl, hydroxymethyl, hydroxyethyl, and carboxyl radicals, where R'' is selected from the group consisting of hydrogen and methyl, where X is selected from the group consisting of

and

where R''' is selected from the group consisting of —H, —CH₃, —OR, —SR, —NR₂, —CN, —SCN, —COOR, and —CHO, where R is selected from the group consisting of hydrogen, methyl, ethyl, n-propyl, and isopropyl, and $n$ is an integer between 0 and 8, inclusive.

9. A process according to claim 8 wherein said monomeric material comprises a major amount of 1,3-butadiene and a minor amount of styrene.

10. In the polymerization of a monomeric material comprising an organic compound having an active $CH_2=C<$ group at a polymerization temperature while dispersed in an aqueous medium in the presence of an oxidant and a reductant, the improvement which comprises using as said oxidant 0.1 to 10 millimols of a trisubstituted hydroperoxymethane, and using as said reductant 0.02 to 5 parts (per 100 parts by weight of said monomeric material) of a compound having the formula

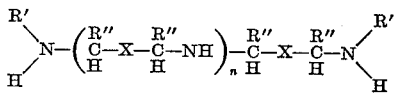

where R' is selected from the group consisting of hydrogen, methyl, ethyl, hydroxymethyl, hydroxyethyl, and carboxyl radicals, where R'' is selected from the group consisting of hydrogen and methyl, where X is selected from the group consisting of

and

where R''' is selected from the group consisting of —H, —CH₃, —OR, —SR, —NR₂, —CN, —SCN, —COOR, and —CHO, where R is selected from the group consisting of hydrogen, methyl, ethyl, n-propyl, and isopropyl, and $n$ is an integer between 0 and 8, inclusive.

11. A process according to claim 10 wherein said aqueous medium is maintained at a pH of at least 10.

12. A process according to claim 11 wherein said pH is within the range of 11.5 to 12, and said reductant is a 1,3-diaminopropane containing three carbon atoms.

13. A process according to claim 12 wherein said reductant is 1,3-diaminoacetone.

14. A process which comprises establishing and maintaining at a polymerization temperature not higher than 10° C. an emulsion of an aqueous phase, a liquid monomeric material comprising an organic compound having an active $CH_2=C<$ group, an emulsifying agent, a peroxidic-type oxidant, and 0.02 to 5 parts (per 100 parts by weight of said monomeric material) of a compound having the formula

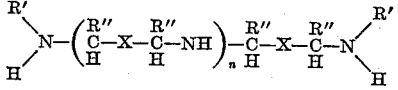

where R' is selected from the group consisting of hydrogen, methyl, ethyl, hydroxymethyl, hydroxyethyl, and carboxyl radicals, where R'' is selected from the group consisting of hydrogen and methyl, where X is selected from the group consisting of

and

where R''' is selected from the group consisting of —H, —CH₃, —OR, —SR, —NR₂, —CN, —SCN, —COOR, and —CHO, where R is selected from the group consisting of hydrogen, methyl, ethyl, n-propyl, and isopropyl, and $n$ is an integer between 0 and 8, inclusive.

15. A process for producing synthetic rubber which comprises establishing and maintaining at a polymerization temperature not in excess of 10° C. an emulsion of an aqueous phase having a pH of at least 10, a liquid monomeric material comprising a major amount of 1,3-butadiene and a minor amount of styrene, an emulsifying agent, a mercaptan reaction modifier, from 0.1 to 10 millimols of a hydroperoxidic oxidant, and from 0.02 to 5 parts of 1,3-diaminoacetone, said amounts being per 100 parts by weight of said monomeric material.

16. A process for producing synthetic rubber which comprises establishing and maintaining at a polymerization temperature not in excess of 10° C. an emulsion of an aqueous phase having a pH of at least 10, a liquid monomeric material comprising a major amount of 1,3-butadiene and a minor amount of styrene, an emulsifying agent, a mercaptan reaction modifier, from 0.1 to 10 millimols of a hydroperoxidic oxidant, and from 0.02 to 5 parts of 1,3-diamino-2-propanol, said amounts being per 100 parts by weight of said monomeric material.

References Cited in the file of this patent

UNITED STATES PATENTS

| Number | Name | Date |
|---|---|---|
| 2,427,847 | Fryling | Sept. 23, 1947 |
| 2,450,552 | Hurdis | Oct. 5, 1948 |
| 2,584,773 | Reynolds et al. | Feb. 5, 1952 |

OTHER REFERENCES

Whitby et al.: Rubber Age, vol. 65, No. 5, August 1949, page 545.